United States Patent [19]
Frank et al.

[11] Patent Number: 5,430,830
[45] Date of Patent: Jul. 4, 1995

[54] ADAPTIVE WEIGHT ADJUSTING CIRCUIT FOR AN NEURAL NETWORK

[75] Inventors: Mark S. Frank; William M. Peterson, both of Chandler, Ariz.

[73] Assignee: Motorola, Inc., Schaumburg, Ill.

[21] Appl. No.: 293,631

[22] Filed: Aug. 22, 1994

[51] Int. Cl.$^6$ .............................................. G06F 15/18
[52] U.S. Cl. ...................................... 395/23; 364/807
[58] Field of Search ................................. 395/23-24; 364/807

[56] References Cited

U.S. PATENT DOCUMENTS

| | | | |
|---|---|---|---|
| 5,093,899 | 3/1992 | Hiraiwa | 395/23 |
| 5,113,483 | 5/1992 | Keeler et al. | 395/23 |
| 5,247,606 | 9/1993 | Tam | 364/807 X |
| 5,268,320 | 12/1993 | Holler et al. | 395/23 X |

Primary Examiner—David R. Hudspeth
Attorney, Agent, or Firm—Eugene A. Parsons

[57] ABSTRACT

A processing element utilizing the learning algorithm $$W_i = W_{i-1} + A_i$$

where $A_i$ is one of $\eta*(X_i - W_{i-1})$, $+1$, $-1$, and $0$, and where:
  $W_i$ = a weight,
  $W_{i-1}$ = a previous weight,
  $\eta$ = a plasticity signal, and
  $X_i$ = an input signal.

A method of generating adaptive weight adjustments, $A_i$, including generating $\eta*(X_i - W_{i-1})$ and additional least significant bits of data representative of the term $\eta*(X_i - W_{i-1})$. Comparing the additional least significant bits of data to a random number and providing $>$, $=$ and $<$, comparison signals. Adding one of $\eta*(X_i - W_{i-1})$, $+1$, $-1$ and $0$, respectively, to the term $W_{i-1}$ when one of the following occurs: at least one bit of $\eta*(X_i - W_{i-1})$ equals one; $\eta*(X_i - W_{i-1})$ equals zero, the comparison signal is $<$ and the sign bit is $+$; $\eta*(X_i - W_{i-1})$ equals zero, the comparison signal is $<$ and the sign bit is $-$; or $\eta*(X_i - W_{i-1})$ equals zero and the comparison signal is $>$ or $=$.

20 Claims, 3 Drawing Sheets

| ADD | $S_1$ | $S_0$ | INPUT TERMINAL |
|---|---|---|---|
| 0 | 0 | 0 | INPUT 34 |
| +1 | 0 | 1 | INPUT 33 |
| −1 | 1 | 0 | INPUT 33 |
| STRAIGHT THROUGH | 1 | 1 | INPUT 31 |

*FIG. 2*

ADAPTIVE WEIGHT ADJUSTING CIRCUIT FOR AN NEURAL NETWORK

FIELD OF THE INVENTION

The present invention pertains to neural networks and more specifically to processing elements which include adaptive weight adjustment circuits with extended precision.

BACKGROUND OF THE INVENTION

Generally, an artificial neural network is composed of many simple processing elements called neurons or neurodes, that typically do little more than take a weighted sum of all its inputs. The neural network responds simultaneously to the inputs presented to it. The result is not stored in a specific memory location, but consists of the overall state of the network after it has reached some equilibrium condition.

In the neural network lexicon, the term "self-organization" generally refers to the ability of some networks to learn without being given the correct answer for an input pattern. One such self-organizing network is utilized in the Kohonen learning system. A Kohonen self-organizing network is surprisingly simple at first glance and consists of a single layer of neurodes which are connected within the layer and the outside world.

In practice, an input pattern is depicted as a plurality of input vectors, or simply "inputs" for this discussion. In a digital network, an input pattern defined by a convenient plurality of data bits (e.g. 8, 16, etc.) is presented to the Kohonen network. Each neurode in the Kohonen layer receives the input pattern and computes a similarity measurement of a weight stored in the neurode (having a similar number of bits) with the input pattern, which is basically the distance between the stored weight vector and the input pattern vector. The neurodes then compete for the privilege of learning with the neurode having the closest similarity measurement being declared the winner. In an original iteration several neurodes in an area with at least one neurod having close similarity measurements are allowed to learn and, ultimately, one neurode is the winner and is allowed to output a signal.

Generally, in a Kohonen neurode a random access memory (RAM) is used to store the plurality of bits representative of one of the stored weights and the function of determining the similarity measurement is performed by various digital components (i.e. multipliers, subtracters, adders, etc.). The various digital components are relatively simple and inexpensive, because they are normally time shared, while the RAM required to store the data bits is a major expense in the complete system. Further, as the storage capacity of the RAM is increased in order to increase the number of data bits being stored so as to increase the definition of the weight vector, the cost and size of the RAM increases dramatically.

Accordingly, it would be advantageous to increase the precision of the processing elements without substantially increasing the cost and size thereof.

It is a purpose of the present invention to provide a new and improved method of generating adaptive weight adjustments with extended precision.

It is another purpose of the present invention to provide a new and improved processing element for generating adaptive weight adjustments with extended precision.

It is yet another purpose of the present invention to provide a new and improved method of generating adaptive weight adjustments with extended precision without increasing the size of the RAM included therein.

It is still another purpose of the present invention to provide a new and improved processing element for generating adaptive weight adjustments with extended precision having very little increase in cost and size.

SUMMARY OF THE INVENTION

The above problems and others are at least partially solved and the above purposes are realized in a neural network having at least one processing element utilizing a learning algorithm of the form $$W_i = W_{i-1} + \eta^*(X_i - W_{i-1})$$

where:
- $W_i$ = a plurality of data bits representative of an adjusted weight,
- $W_{i-1}$ = a similar plurality of data bits representative of a previous or stored weight,
- $\eta$ = a plasticity signal, and
- $X_i$ = a similar plurality of data bits representative of an input signal.

The processing element is utilized in a method of generating adaptive weight adjustments with extended precision including generating a similar plurality of data bits (similar in number to $W_i$) representative of the term $\eta^*(X_i - W_{i-1})$ and additional least significant bits of data further representing the term $\eta^*(X_i - W_{i-1})$. A variable modifying number is provided and compared to the additional least significant bits of data, and first, second and third random modifier signals representative of $>$, $=$, and $<$, respectively are provided. Subsequently, one of the following steps is performed: the term $\eta^*(X_i - W_{i-1})$ is added to the term $W_{i-1}$ when at least one of the similar plurality of data bits (exclusive of the sign bit) representative of the term $\eta^*(X_i - W_{i-1})$ equals one; a first predetermined amount (e.g. $+1$) is added to the term $W_{i-1}$ when all of the similar plurality of data bits representative of the term $\eta^*(X_i - W_{i-1})$ equal zero, the third random modifier signal is provided and the sign bit of the similar plurality of data bits representative of the term $\eta^*(X_i - W_{i-1})$ is $+$; a second predetermined amount (e.g. $-1$) is added to the term $W_{i-1}$ when all of the similar plurality of data bits representative of the term $\eta^*(X_i - W_{i-1})$ equal zero, the third random modifier signal is provided and the sign bit of the similar plurality of data bits representative of the term $\eta^*(X_i - W_{i-1})$ is $-$; and a third predetermined amount (e.g. 0) is added to the term $W_{i-1}$ when all of the similar plurality of data bits representative of the term $\eta^*(X_i - W_{i-1})$ equal zero and one of the first and second random modifier signals are provided.

BRIEF DESCRIPTION OF THE DRAWING

Referring to the drawings:

FIG. 2 illustrates a logic table for the processing element of FIG. 1; and

DESCRIPTION OF THE PREFERRED EMBODIMENTS

Figure 1:
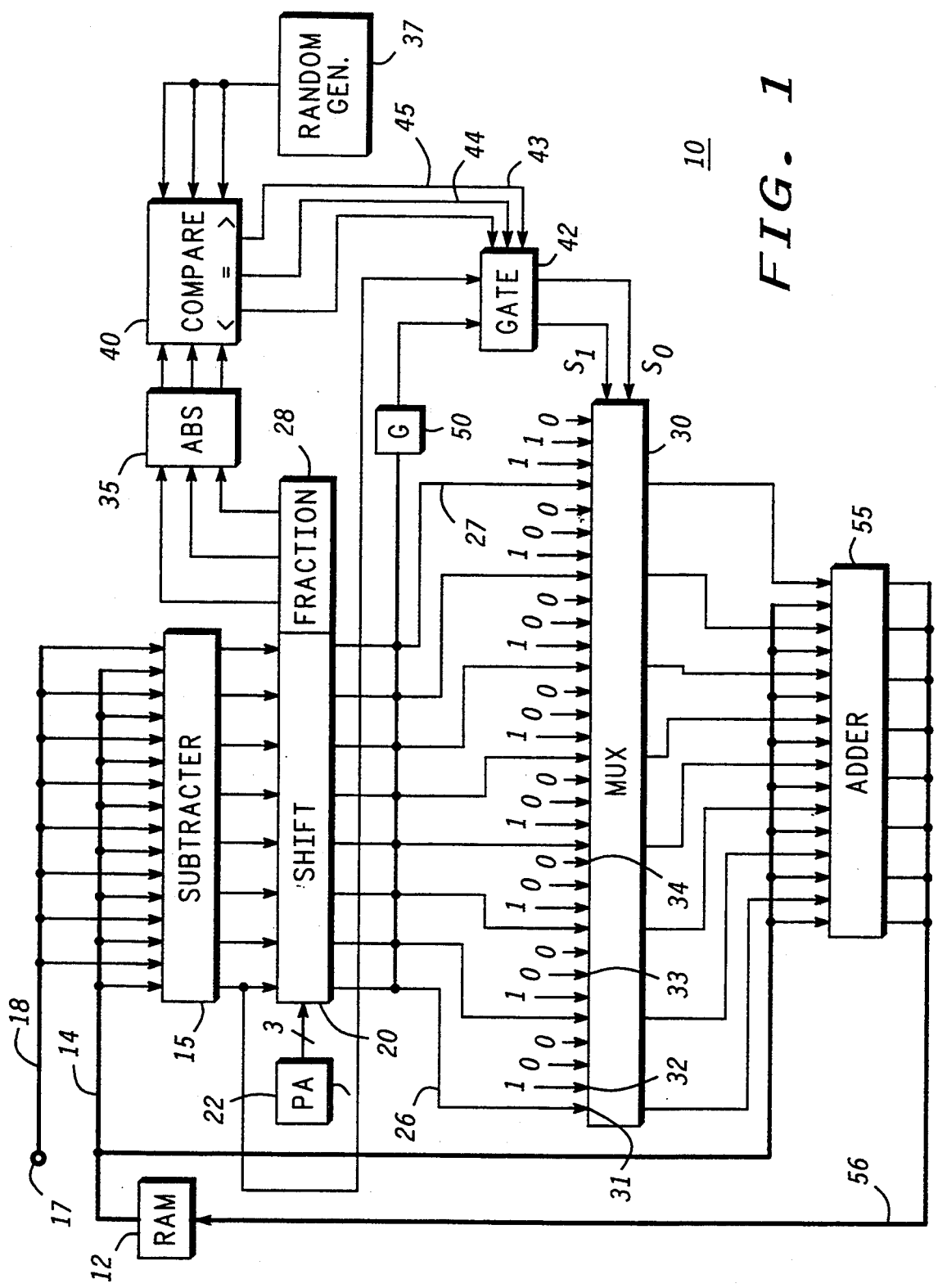
FIG. 1 illustrates a simplified block diagram of a processing element utilized in a method of generating adaptive weight adjustments with extended precision in accordance with the present invention.

Referring specifically to FIG. 1, a processing element 10, designed for use in a neural network, is illustrated utilizing the general learning algorithm $$W_i = W_{i-1} + A_i.$$

It should be understood that processing element 10 can be used in any of a variety of adaptive neural networks, including those using delta rule, back propagation, Kohhonen, etc. In the above algorithm: $W_i$ is a plurality of data bits representative of an adjusted weight; $W_{i-1}$ is a plurality of stored bits (similar in number to $W_i$) representative of a stored weight; and $A_i$ is a similar plurality of data bits representative of one of the modifiers $+1$, $-1$, and $0$ or the product $\eta^*(X_i - W_{i-1})$, wherein $\eta$ is a plasticity signal and $X_i$ is a similar plurality of data bits representative of an input signal.

Processing element 10 includes a random access memory (RAM) 12 for storing the weight vector, hereinafter simply referred to as a weight. In processing element 10 the weight stored in RAM 12 and available on a bus 14 is designated $W_{i-1}$ to indicate an unmodified weight. Also, in this specific embodiment and for purposes of explanation only $W_{i-1}$ is defined by eight digital bits so that, consequently, RAM 12 is capable of storing eight bits and bus 14 includes eight lines. As explained above, RAM 12 is a major portion of the expense of processing element 10 and the remainder thereof is a relatively small and inexpensive portion when time-shared in a complete system.

The eight lines of bus 14 are connected to an eight bit input of a subtracter circuit 15. Also, a similar plurality (8 in this embodiment) of data bits representative of an input signal $X_i$ are supplied to an input terminal 17 for processing element 10. An eight line bus 18 is connected from input terminal 17 to a second eight bit input of subtracter 15. Thus, 8 bits of data representative of $W_{i-1}$ and 8 bits of data representative of $X_i$ are applied to subtracter 15 which provides 8 bits of data representative of a difference signal $X_i - W_{i-1}$.

The difference signal from subtracter 15 is supplied to a shift register 20. It should be understood that while shift register 20 is used in this specific embodiment, a multiplexer, barrel shifter, or the like could be substituted if desired. Shift register 20 has second input terminals, which in this embodiment are connected to receive a 3-bit signal representative of a plasticity signal $\eta$ from a plasticity generator 22. For purposes of this disclosure, the term "plasticity" means a learning constant or modifier that is used to alter the data generally in accordance with the number of the iteration being operated upon. In this specific disclosure, the plasticity constant lies in the range $0 \leq \eta < 1$. Generally, the plasticity constant is large, or maximum, initially, and gradually reduces in magnitude so as to asymptotically approach zero change or alteration in the data. Shift register 20 performs or generates the product $\eta^*(X_i - W_{i-1})$ in response to reception of the difference signal $X_i - W_{i-1}$ and the plasticity signal $\eta$. As is known in the art, shift register 20 actually performs a $2^{-\eta}$ multiplication, which is a simple shift right.

Shift register 20 generates a similar plurality of data bits (i.e. 8) representative of the term $\eta^*(X_i - W_{i-1})$. A bit 26 is the most significant bit (MSB) of the plurality of bits and a bit 27 is the least significant bit (LSB). Further, shift register 20 includes a fractional portion 28 for generating supplemental or fractional bits of data, less than LSB 27, which essentially are a number of bits that serve to define a fractional part of term $\eta^*(X_i - W_{i-1})$. It should be understood that while 3-bits are provided as the fractional bits in this specific embodiment, any convenient number may be utilized with the understanding that larger numbers of fractional bits provide finer definition but that too large a number may exceed the ability of processing element 10 to utilize the information.

The plurality of bits of data from MSB 26 to LSB 27 (i.e. 8 bits) of shift register 20 are applied to a first set of inputs 31, including a similar number, for a multiplexer circuit 30. In this specific embodiment, MSB 26 is a sign bit which defines whether the stored weight ($W_{i-1}$) on bus 14 is larger or smaller than the input signal $X_i$ on bus 18. Multiplexer circuit 30 has a second set of inputs 32 which have a first predetermined signal (or weight amount) continuously applied thereto, a third set of inputs 33 which have a second predetermined signal continuously applied thereto, and a fourth set of inputs 34 which have a third predetermined signal continuously applied thereto. For purposes of explanation in this specific embodiment, the first predetermined signal is all logic highs or 1s (11111111), which is a $-1$, the second predetermined signal is all logic lows except the LSB which is a logic high (00000001), which is a $+1$, and the third predetermined signal is all logic lows or 0s (00000000), which is a 0. As is known in the art, multiplexer circuit 30 can be controlled to output any one of the four different signals applied to the four sets of inputs 31 through 34. Multiplexer 30 is controlled, in this embodiment, by applying a 2-bit signal to a pair of terminals designated $S_0$ and $S_1$.

The additional bits of data generated by fractional portion 28 of shift register 20 are transformed into an absolute value of the fractional number and then applied to a storage device or latch 35. A random number generator 37 is provided to generate a number (similar to the number of bits stored in latch 35) of random bits. The fractional number, or bits, stored in latch 35 are compared in a comparator 40 to the random bits from random generator 37. If the random number is greater than ($>$) the value of the fractional number, a first random modifier signal is supplied to a gate circuit 42 on a first lead 43. If the random number is equal to ($=$) the value of the fractional number, a second random modifier signal is supplied to gate circuit 42 on a second lead 44. If the random number is less than ($<$) the value of the fractional number, a third random modifier signal is supplied to gate circuit 42 on a third lead 45.

Gate circuit 42 also has an input connected to receive the sign bit, from output lead 26 of shift register 20. Finally, all 8 of the bits on outputs 26 through 27 of shift register 20 are combined in a known fashion in an OR gate 50 and the output signal is applied to an input terminal of gate circuit 42. Basically, OR gate 50 supplies a first signal if all eight of the outputs of shift register 20 are a logic low or 0 and a second signal if at least one of the eight outputs of shift register 20 is a logic high, or 1.

In this specific embodiment, multiplexer 30 is designed in accordance with the table of FIG. 2. That is, if two logic lows, or 0s, are applied to terminals $S_0$ and $S_1$ input 34 is selected and all logic lows, or 0s, appear at the output terminals of multiplexer 30; if a logic low is applied to terminal $S_1$ and a logic high is applied to terminal $S_0$, input 33 is selected and all logic lows except the LSB (+1) appear at the output terminals of multiplexer 30; if a logic low is applied to terminal $S_0$ and a logic high is applied to terminal $S_1$, input 32 is selected and all logic highs (−1) appear at the output terminals of multiplexer 30; and if two logic highs, or 1s, are applied to terminals $S_0$ and $S_1$ input 31 is selected and all the output bits from shift register 20 pass through multiplexer 30 and appear at the output terminals of multiplexer 30.

Gate circuit 42 can be a simple logic circuit or any logic equivalent (e.g. ROM table, RAM table, etc.) or may be included as a portion of the more complicated semiconductor CPUs, AIs, etc. which are capable of performing the following determination. When OR gate 50 supplies a second signal to gate circuit 42 (at least one of the eight outputs of shift register 20 is a logic high), gate circuit 42 supplies a 1 to both terminals $S_0$ and $S_1$. When OR gate 50 supplies a first signal to gate circuit 42 (all eight outputs of shift register 20 are a logic low), gate circuit 42 looks at the outputs of comparator 40. If the random number generated by random generator 37 is greater than the absolute value of the fractional number from latch 35, two 0s are applied to the $S_0$ and $S_1$ inputs, respectively. Also, if the random number generated by random generator 37 is equal to the absolute value of the fractional bits from latch 35, two 0's are applied to the $S_0$ and $S_1$ inputs. If the random number generated by random generator 37 is less than the absolute value of the fractional bits from latch 35, the sign bit is looked at and +1 is added if the sign is +($S_1=0$, $S_0=1$), and −1 is added if the sign is −($S_1=1$, $S_0=0$).

The output terminals of multiplexer 30 are connected to a first set of input terminals of an adder 55. The eight lines of bus 14 are connected to a second set of input terminals of adder 55 to apply unmodified weight $W_{i-1}$ thereto. Thus, the output of adder 55 is $W_{i-1}+A_i$, where $A_i$ is a similar plurality of data bits representative of one of the modifiers +1, −1, and 0 or the product $\eta^*(X_i-W_{i-1})$. This output, which is designated $W_i$, is applied on an 8 lead bus 56 as an input to RAM 12 and replaces unmodified weight $W_{i-1}$ therein. Once unmodified weight $W_{i-1}$ is replaced or modified into $W_i$, a second iteration may be instigated and the new weight is used on bus 14 for the second iteration. Here it will be understood that any or all of the various components of processing element 10 can be included on a single semiconductor chip so that the small number of additional bits and the components for processing them is relatively small and easy to integrate into processing element 10.

Basically, the unmodified or stored weight $W_{i-1}$ and the input signal $X_i$ are compared to determine how similar they are. When the difference between them is anything but logic lows (all zeros) the term $\eta^*(X_i-W_{i-1})$ is utilized to modify the stored weight during each iteration. As soon as the stored weight has been modified sufficiently (a number of iterations have been performed) to change it to all zeros, the additional bits are processed to determine how large a fraction of a bit difference is involved. To perform this processing the fraction of a bit difference is compared to a random number. If the fraction of a bit difference is large, the random number is less than (<) the absolute value of the fraction of a bit difference a larger percentage of the iterations and first or second predetermined amounts (in this embodiment +1 or −1) are added to $W_{i-1}$ more often. As the fraction of a bit difference becomes closer to zero (smaller), it is greater than the random number a smaller percentage of the iterations and first or second predetermined amounts are added to $W_{i-1}$ less often. Thus, the unmodified or stored weight $W_{i-1}$ approaches the input signal $X_i$ with 11 bit precision generally asymptotically.

Figure 3:
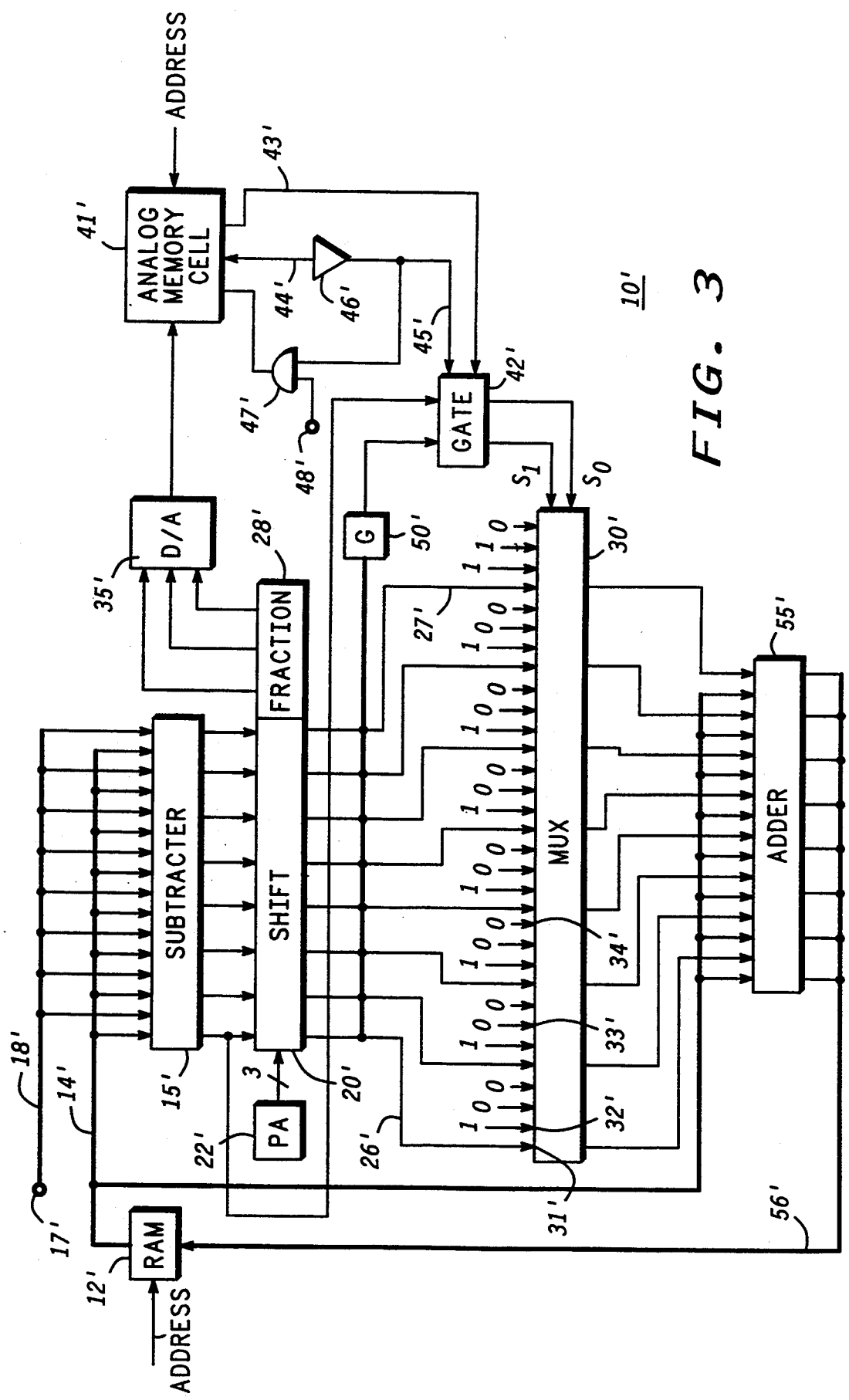
FIG. 3 illustrates a simplified block diagram of a processing element similar to that illustrated in FIG. 1, with the extended precision apparatus being analog circuitry.

Referring specifically to FIG. 3, a simplified block diagram of a processing element 10' utilizing analog, rather than digital, extended precision apparatus. Processing element 10' of FIG. 3 is similar to processing element 10 of FIG. 1 and similar components are designated with similar numbers, all of the numbers having a prime added to indicate a different embodiment. Further, components of processing element 10' which are similar and operate the same as components of processing element 10 of FIG. 1 will not be explained in detail again.

The three bits of data from fractional component 28' of shift register 20' representative of fractional data are supplied to a digital to analog converter 35' where they are converted to an analog voltage, charge, polarization, etc. proportional to the fractional data. This voltage (or charge, polarization, etc. ), which is a plus or minus graduated value, is added to whatever voltage (or charge, polarization, etc.) is already stored in an analog memory cell 41'. Analog memory cell 41' may include any of a floating gate memory cell, ferroelectric memory cell, etc. Thus, analog memory cell 41' collects statistics over time.

A sign output of analog memory cell 41' indicative of the sign of the stored data, is supplied directly to an input of gate circuit 42' on a lead 43' and a value output, indicative of the value or amplitude of the stored data, is supplied to an input of a limiter 46' on a second lead 44'. Limiter 46' essentially includes a threshold value below which no signal is outputted. Once the threshold of limiter 46' is exceeded a signal is supplied on a lead 45' to a second input of gate circuit 42' The signals on leads 43' and 45' cooperate to cause gate circuit 42' to supply a 0, 1 or a 1, 0 to the S1 and S0 inputs of multiplexer 30', resulting in the outputting of a full +1 or a −1, respectively, from multiplexer 30'.

The value output on lead 45' from limiter 46' is also supplied to a first input of an AND gate 47'. A second input 48' of AND gate 47' is connected to receive a signal indicative of the fact that the stored digital weight (e.g. a signal from RAM 12') has been changed by a full ±1. An output signal from AND gate 47' is supplied to analog memory cell 41' to reset the cell back to an original setting (e.g. 0) so that analog memory cell 41' is ready to begin collecting data again.

One additional difference between the digital and analog versions of the present structure is that each digital weight stored in RAM 12' has an associated analog memory cell 41'. Thus, the digital weights stored in RAM 12' and associated analog memory cells 41' are addressed by the same address decode system (not shown).

Again, it will be understood that 8 bit components and an additional 3 bits are disclosed herein for purposes of explanation, but it will be understood by those skilled in the art that any desired and convenient number of basic bits and additional bits can be utilized. Also, while processing element 10 has been disclosed in specific digital and analog configurations, it is believed that a similar concept can be applied to other configurations not disclosed herein.

Here it should be noted that processing element 10 effectively approaches 11 bit precision for weight updating, or learning while only requiring 8 bit major components. Further, the fractional portion 28 of shift register 20 and the attached processing equipment is in the small, inexpensive part of processing element 10 and no expensive changes are made to RAM 12. Thus, a method of generating adaptive weight adjustments with extended precision is disclosed which does not substantially increase the cost of the method. Further, adaptive weight adjustments with extended precision are disclosed which do not substantially increase the cost of the processing element.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In a neural network having at least one processing element utilizing a learning algorithm $$W_i = W_{i-1} + \eta^*(X_i - W_{i-1})$$

where:
$W_i$ = data representative of a weight,
$W_{i-1}$ = data representative of a previous weight,
$\eta$ = a plasticity signal, and
$X_i$ = data representative of an input signal,
a method of generating adaptive weight adjustments with extended precision for the processing element, comprising the steps of:

generating data representative of the term $\eta^*(X_i - W_{i-1})$ and additional fractional data representative of the term $\eta^*(X_i - W_{i-1})$;

monitoring the term $\eta^*(X_i - W_{i-1})$ and the fractional data and performing one of the following steps adding the term $\eta^*(X_i - W_{i-1})$ to the term $W_{i-1}$ when the data representative of the term $\eta^*(X_i - W_{i-1})$ is not equal to zero, adding a first predetermined amount to the term $W_{i-1}$ when the term $\eta^*(X_i - W_{i-1})$ equals zero and the fractional data is greater than a set amount, and adding a second predetermined amount to the term $W_{i-1}$ when the data representative of the term $f^*(X_i - W_{i-1})$ equals zero and the fractional data is less than a set amount.

2. In a neural network having at least one processing element utilizing a learning algorithm $$W_i = W_{i-1} + \eta^*(X_i - W_{i-1})$$

where:
$W_i$ = data representative of a weight,
$W_{i-1}$ = data representative of a previous weight,
$\eta$ = a plasticity signal, and
$X_i$ = data representative of an input signal,
a method of generating adaptive weight adjustments with extended precision for the processing element, comprising the steps of:

generating data including a polarity sign, representative of the term $\eta^*(X_i - W_{i-1})$ and additional fractional data representative of the term $\eta^*(X_i - W_{i-1})$;

providing a variable modifying number;

comparing the additional fractional data to the modifying number and providing first, second and third random modifier signals representative of $>$, $=$, and $<$, respectively; and performing one of the following steps adding the term $\eta^*(X_i - W_{i-1})$ to the term $W_{i-1}$ when the data representative of the term $\eta^*(X_i - W_{i-1})$ is not equal to zero, adding a first predetermined amount to the term $W_{i-1}$ when all of the data representative of the term $\eta^*(X_i - W_{i-1})$ equal zero, the third random modifier signal is provided and the polarity sign representative of the term $\eta^*(X_i - W_{i-1})$ is $+$, adding a second predetermined amount to the term $W_{i-1}$ when the data representative of the term $\eta^*(X_i - W_{i-1})$ equals zero, the third random modifier signal is provided and the polarity sign of the data representative of the term $\eta^*(X_i - W_{i-1})$ is $-$, and adding a third predetermined amount to the term $W_{i-1}$ when the data representative of the term $\eta^*(X_i - W_{i-1})$ equals zero and one of the first and second random modifier signals are provided.

3. In a neural network having at least one processing element utilizing a learning algorithm $$W_i = W_{i-1} + \eta^*(X_i W_{i-1})$$

where:
$W_i$ = a plurality of data bits representative of a weight,
$W_{i-1}$ = a similar plurality of data bits representative of a previous weight,
$\eta$ = a plasticity signal, and
$X_i$ = a similar plurality of data bits representative of an input signal, a method of generating adaptive weight adjustments with extended precision to the similar plurality of bits of data for the processing element, comprising the steps of:

generating a similar plurality of data bits, including a sign bit, representative of the term $\eta^*(X_i - W_{i-1})$ and additional least significant bits of data representative of the term $\eta^*(X_i - W_{i-1})$;

providing a variable modifying number;

comparing the additional least significant bits of data to the modifying number and providing first, second and third random modifier signals representative of $>$, $=$, and $<$, respectively; and performing one of the following steps adding the term $\eta^*(X_i - W_{i-1})$ to the term $W_{i-1}$ when at least one of the similar plurality of data bits representative of the term $\eta^*(X_i - W_{i-1})$, exclusive of the sign bit, equals one, adding a first predetermined amount to the term $W_{i-1}$ when all of the similar plurality of data bits representative of the term $\eta^*(X_i - W_{i-1})$ equal zero, the third random modifier signal is provided and the sign bit of the similar plurality of data bits representative of the term $\eta^*(X_i - W_{i-1})$ is $+$, adding a second predetermined amount to the term $W_{i-1}$ when all of the similar plurality of data bits representative of the term $\eta^*(X_i - W_{i-1})$ equal zero, the third random modifier signal is provided and the sign bit of the similar plurality of data bits representative of the term $\eta^*(X_i-W_{i-1})$ is −, and adding a third predetermined amount to the term $W_{i-1}$ when all of the similar plurality of data bits representative of the term $\eta^*(X_i-W_{i-1})$ equal zero and one of the first and second random modifier signals are provided.

4. A method of generating adaptive weight adjustments with extended precision as claimed in claim 3 wherein the step of providing a variable modifying number includes generating a random number.

5. A method of generating adaptive weight adjustments with extended precision as claimed in claim 3 wherein the step of comparing the additional least significant bits of data to the modifying number includes comparing an absolute value of the additional least significant bits of data to the modifying number.

6. A method of generating adaptive weight adjustments with extended precision as claimed in claim 3 where in the step of adding a first predetermined amount to the term $W_{i-1}$, the first predetermined amount added is +1.

7. A method of generating adaptive weight adjustments with extended precision as claimed in claim 3 where in the step of adding a second predetermined amount to the term $W_{i-1}$, the second predetermined amount added is −1.

8. A method of generating adaptive weight adjustments with extended precision as claimed in claim 3 where in the step of adding a third predetermined amount to the term $W_{i-1}$, the third predetermined amount added is 0.

9. A method of generating adaptive weight adjustments with extended precision as claimed in claim 3 including in addition the step of providing storage means for the term $W_{i-1}$, and further including as a final step the step of replacing $W_{i-1}$ with $W_i$ in the storage means.

10. A method of generating adaptive weight adjustments with extended precision as claimed in claim 3 wherein the step of performing one of the steps of adding the term $\eta^*(X_i-W_{i-1})$ to the term $W_{i-1}$, adding a first predetermined amount to the term $W_{i-1}$, adding a second predetermined amount to the term $W_{i-1}$ and adding a third predetermined amount to the term $W_{i-1}$ includes multiplexing $\eta^*(X_i-W_{i-1})$, the first predetermined amount, the second predetermined amount and the third predetermined amount with a multiplexer and controlling the multiplexer with the similar plurality of data bits representative of the term $\eta^*(X_i-W_{i-1})$, the first, second and third random modifier signals and the sign bit of the similar plurality of data bits representative of the term $\eta^*(X_i-W_{i-1})$.

11. In a neural network having at least one processing element utilizing a learning algorithm $$W_i = W_{i-1} + \eta^*(X_i - W_{i-1})$$

where:
$W_i$ = a plurality of data bits representative of a weight,
$W_{i-1}$ = a similar plurality of data bits representative of a stored weight,
$\eta$ = a plasticity signal, and
$X_i$ = a similar plurality of data bits representative of an input signal, a method of generating adaptive weight adjustments with extended precision to the similar plurality of bits of data for the processing element, comprising the steps of:

storing the plurality of data bits representative of the term $W_{i-1}$;

providing $X_i$;

providing $\eta$;

utilizing $W_{i-1}$, $X_i$ and $\eta$, generating a similar plurality of data bits, including a sign bit, representative of the term $\eta^*(X_i-W_{i-1})$ and additional least significant bits of data representative of the term $\eta^*(X_i-W_{i-1})$;

generating a random number;

comparing the random number to the absolute value of the additional least significant bits of data and providing first, second and third random modifier signals representative of >, =, and <, respectively;

determining $W_i$ by performing one of the following steps adding the term $\eta^*(X_i-W_{i-1})$ to the term $W_{i-1}$ when at least one of the similar plurality of data bits representative of the term $\eta^*(X_i-W_{i-1})$, exclusive of the sign bit, equals one, adding a first predetermined amount to the term $W_{i-1}$ when all of the similar plurality of data bits representative of the term $\eta^*(X_i-W_{i-1})$ equal zero, the third random modifier signal is provided and the sign bit of the similar plurality of data bits representative of the term $\eta^*(X_i-W_{i-1})$ is +, adding a second predetermined amount to the term $W_{i-1}$ when all of the similar plurality of data bits representative of the term $\eta^*(X_i-W_{i-1})$ equal zero, the third random modifier signal is provided and the sign bit of the similar plurality of data bits representative of the term $\eta^*(X_i-W_{i-1})$ is −, and adding a third predetermined amount to the term $W_{i-1}$ when all of the similar plurality of data bits representative of the term $f^*(X_i-W_{i-1})$ equal zero and one of the first and second random modifier signals are provided; and replacing the stored plurality of bits representative of the term $W_{i-1}$ with the similar plurality of bits representative of the determined $W_i$.

12. A method of generating adaptive weight adjustments with extended precision as claimed in claim 11 where in the step of adding a first predetermined amount to the term $W_{i-1}$, the first predetermined amount added is +1.

13. A method of generating adaptive weight adjustments with extended precision as claimed in claim 11 where in the step of adding a second predetermined amount to the term $W_{i-1}$, the second predetermined amount added is −1.

14. A method of generating adaptive weight adjustments with extended precision as claimed in claim 11 where in the step of adding a third predetermined amount to the term $W_{i-1}$, the third predetermined amount added is 0.

15. A method of generating adaptive weight adjustments with extended precision as claimed in claim 11 wherein the step of determining $W_i$ by performing one of the steps of adding the term $\eta^*(X_i-W_{i-1})$ to the term $W_{i-1}$, adding a first predetermined amount to the term $W_{i-1}$, adding a second predetermined amount to the term $W_{i-1}$ and adding a third predetermined amount to the term $W_{i-1}$ includes multiplexing $\eta^*(X_i-W_{i-1})$, the first predetermined amount, the second predetermined amount and the third predetermined amount with a multiplexer and controlling the multiplexer with the similar plurality of data bits representative of the term $f^*(X_i-W_{i-1})$, the first, second and third random modifier signals and the sign bit of the similar plurality of data bits representative of the term $\eta^*(X_i-W_{i-1})$.

16. A method of generating adaptive weight adjustments with extended precision as claimed in claim 11 wherein the step of providing $\eta$ includes providing $\eta$ lying in the range $0=\eta<1$.

17. An adaptive weight adjusting circuit with extended precision in a neural network having at least one processing element utilizing a learning algorithm $$W_i = W_{i-1} + \eta^*(X_i - W_{i-1})$$

where:
$W_i$ = data representative of a weight,
$W_{i-1}$ = data representative of a previous weight,
$\eta$ = a plasticity signal, and
$X_i$ = data representative of an input signal,
the adaptive weight adjustment circuit with extended precision comprising:
  apparatus for generating data representative of the term $\eta^*(X_i-W_{i-1})$ and additional fractional data representative of the term $\eta^*(X_i-W_{i-1})$; and
  circuitry for monitoring the term $\eta^*(X_i-W_{i-1})$ and the fractional data and performing one of the following functions
    adding the term $\eta^*(X_i-W_{i-1})$ to the term $W_{i-1}$ when the data representative of the term $\eta^*(X_i-W_{i-1})$ is not equal to zero,
    adding a first predetermined amount to the term $W_{i-1}$ when the term $\eta^*(X_i-W_{i-1})$ equals zero and the fractional data is greater than a set amount, and
    adding a second predetermined amount to the term $W_{i-1}$ when the data representative of the term $\eta^*(X_i-W_{i-1})$ equals zero and the fractional data is less than a set amount.

18. An adaptive weight adjusting circuit with extended precision in a neural network having at least one processing element utilizing a learning algorithm $$W_i = W_{i-1} + \eta^*(X_i - W_{i-1})$$

where:
$W_i$ = a plurality of data bits representative of a weight,
$W_{i-1}$ = a similar plurality of data bits representative of a stored weight,
$\eta$ = a plasticity signal, and
$X_i$ = a similar plurality of data bits representative of an input signal,
the adaptive weight adjustment circuit with extended precision comprising:
  a data input including terminals for the plurality of bits of data of $X_i$;
  weight storing means for storing a similar plurality of bits of weight information $W_{i-1}$, the weight storing means having a stored information output for providing $W_{i-1}$ thereon and a new weight input for receiving a similar plurality of bits of new weight information $W_i$;
  a subtracter circuit having first and second inputs with the first input being connected to receive $X_i$ and the second input being connected to receive $W_{i-1}$ from the output of the weight storing means, the subtracter circuit further having a difference output for providing thereon a similar plurality of bits of difference information $X_i-W_{i-1}$;
  a plasticity signal generator for generating a plasticity signal $\eta$;
  a multiplier circuit having a first input connected to the difference output for receiving $X_i-W_{i-1}$ and a second input connected to the plasticity signal generator to receive $\eta$, the multiplier circuit having a product output for providing thereon a similar plurality of bits of product information $\eta^*(X_i-W_{i-1})$, the multiplier circuit having an LSB output for providing thereon additional least significant bits of product information;
  a multiplexer circuit having a first input connected to the product output for receiving $\eta^*(X_i-W_{i-1})$, a second input connected to receive a first predetermined signal, a third input connected to receive a second predetermined signal and a fourth input connected to receive a third predetermined signal, and a control input connected to receive control signals indicative of a determined weight change and to select one of the first, second, third and fourth inputs in response to control signals applied thereto, the multiplexer further having a weight change output for providing thereon a similar plurality of bits of weight change information;
  an adder circuit having a first input connected to the weight change output for receiving the plurality of bits of weight change information and a second input connected to the stored information output for receiving $W_{i-1}$, the adder circuit having a new weight information output $W_i$ connected to the new weight input of the weight storing means for providing $W_i$ thereto;
  a generator having an output for providing thereon a plurality of bits representative of a variable number;
  a comparator having a first input coupled to receive the LSB output of the multiplier circuit and a second input connected to receive the variable number and an output providing a comparison signal indicative of a comparison therebetween; and
  bit change logic circuitry having a first input connected to the product output of the multiplier circuit for receiving $\eta^*(X_i-W_{i-1})$, a second input connected to the product output of the multiplier circuit for receiving a signal representative of the sign of the product output of the multiplier circuit and a third input connected to the output of the comparator, the bit change circuit having an output connected to the second input of the multiplexer circuit to supply control signals to select one of the first, second, third and fourth inputs in response to a predetermined combination of the value of $\eta^*(X_i-W_{i-1})$, the sign of the product, and the comparison signal.

19. An adaptive weight adjusting circuit with extended precision in a neural network having at least one processing element utilizing a learning algorithm $$W_i = W_{i-1} + \eta^*(X_i - W_{i-1})$$

where:

$W_i$ = a plurality of data bits representative of a weight, $W_{i-1}$ = a similar plurality of data bits representative of a stored weight, $\eta$ = a plasticity signal, and $X_i$ = a similar plurality of data bits representative of an input signal, the adaptive weight adjustment circuit with extended precision comprising:

a data input including terminals for the plurality of bits of data of $X_i$;

weight storing means for storing a similar plurality of bits of weight information $W_{i-1}$, the weight storing means having a stored information output for providing $W_{i-1}$ thereon and a new weight input for receiving a similar plurality of bits of new weight information $W_i$;

a subtracter circuit having first and second inputs with the first input being connected to receive $X_i$ and the second input being connected to receive $W_{i-1}$ from the output of the weight storing means, the subtracter circuit further having a difference output for providing thereon a similar plurality of bits of difference information $X_i - W_{i-1}$;

a plasticity signal generator for generating a plasticity signal $\eta$;

a multiplier circuit having a first input connected to the difference output for receiving $X_i - W_{i-1}$ and a second input connected to the plasticity signal generator to receive $\eta$, the multiplier circuit having a product output for providing thereon a similar plurality of bits of product information $\eta*(X_i - W_{i-1})$, the multiplier circuit having an LSB output for providing thereon additional least significant bits of product information;

a multiplexer circuit having a first input connected to the product output for receiving $\eta*(X_i - W_{i-1})$, a second input connected to receive a first predetermined signal, a third input connected to receive a second predetermined signal and a fourth input connected to receive a third predetermined signal, and a control input connected to receive control signals indicative of a determined weight change and to select one of the first, second, third and fourth inputs in response to control signals applied thereto, the multiplexer further having a weight change output for providing thereon a similar plurality of bits of weight change information;

an adder circuit having a first input connected to the weight change output for receiving the plurality of bits of weight change information and a second input connected to the stored information output for receiving $W_{i-1}$, the adder circuit having a new weight information output $W_i$ connected to the new weight input of the weight storing means for providing $W_i$ thereto;

absolute value storage means having an input connected to the LSB output of the multiplier circuit for receiving and storing an absolute value of the additional least significant bits of product information, the absolute value storage means having an absolute value output for providing thereon the absolute value of the additional least significant bits of product information;

a random generator having a random number output for providing thereon a plurality of bits representative of a random number;

a comparator having a first input connected to the absolute value output of the absolute value storage means and a second input connected to the random number output of the random generator, the comparator having an output; and a bit change logic circuit having a first input connected to the product output of the multiplier circuit for receiving $\eta*(X_i - W_{i-1})$, a second input connected to the product output of the multiplier circuit for receiving a signal representative of the sign of the product output of the multiplier circuit and a third input connected to the output of the comparator, the bit change circuit having an output connected to the second input of the multiplexer circuit to supply control signals to select one of the first, second, third and fourth inputs in response to a predetermined combination of the value of $\eta*(X_i - W_{i-1})$, the sign of the product, and comparisons between the absolute value output of the absolute value storage means and the random number.

20. An adaptive weight adjusting circuit as claimed in claim 19 wherein the plasticity signal generator for generating a plasticity signal $\eta$ includes a plasticity signal generator constructed to generate a plasticity signal in the range $0 \leq \eta < 1$.

* * * * *

UNITED STATES PATENT AND TRADEMARK OFFICE
CERTIFICATE OF CORRECTION

PATENT NO. : 5,430,830
DATED : July 4, 1995
INVENTOR(S) : Frank, et al

It is certified that error appears in the above-indentified patent and that said Letters Patent is hereby corrected as shown below:

Claim 1, column 7, line 52, replace "$f*(X_i - W_{i-1})$" with $\eta*(X_i - W_{i-1})$.

Claim 3, column 8, line 31, replace "$W_i = W_{i-1} + \eta*(X_iW_{i-1})$" with $W_i = W_{i-1} + \eta*(X_i - W_{i-1}$.

Claim 11, column 10, line 41, replace "$f*(X_i - W_{i-1})$" with $\eta*(X_i - W_{i-1})$.

Claim 15, column 11, line 6, replace "$f*(X_i - W_{i-1})$" with $\eta*(X_i - W_{i-1})$.

Claim 16, column 11, line 13, replace "$0 = \eta < 1$" with $0 \leq \eta < 1$.

UNITED STATES PATENT AND TRADEMARK OFFICE
CERTIFICATE OF CORRECTION

PATENT NO. : 5,430,830
DATED : July 4, 1995
INVENTOR(S) : Frank, et al

It is certified that error appears in the above-indentified patent and that said Letters Patent is hereby corrected as shown below:

Claim 20, column 14, line 47, replace "$0 \leq \bar{\eta} < 1$" with $0 \leq \eta < 1$.

Signed and Sealed this

Twenty-fourth Day of October, 1995

Attest:

BRUCE LEHMAN

*Attesting Officer*     *Commissioner of Patents and Trademarks*